United States Patent
Meloche

(10) Patent No.: US 9,912,524 B2
(45) Date of Patent: Mar. 6, 2018

(54) SYSTEM AND METHOD FOR DYNAMIC SESSION MAPS

(75) Inventor: Jean Meloche, Madison, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1236 days.

(21) Appl. No.: 13/408,297

(22) Filed: Feb. 29, 2012

(65) Prior Publication Data

US 2013/0227117 A1   Aug. 29, 2013

(51) Int. Cl.
| | | |
|---|---|---|
| *G06F 15/173* | (2006.01) | |
| *H04L 12/24* | (2006.01) | |
| *H04L 12/26* | (2006.01) | |

(52) U.S. Cl.
CPC ........ *H04L 41/065* (2013.01); *H04L 41/0645* (2013.01); *H04L 43/10* (2013.01)

(58) Field of Classification Search
CPC ........ G06F 17/30; G06F 9/00; G06F 11/2064; G06F 11/2074; G06F 13/4045; G06F 13/4282; G06F 2213/0042; G06F 17/30902; G06F 13/126; H04L 67/1097; H04L 69/164; H04L 12/18; H04L 12/1854; H04L 12/1877; H04L 47/15; H04L 12/4646; H04L 41/065; H04L 41/0645; H04L 43/10
USPC ........................................................ 370/392
See application file for complete search history.

(56) References Cited

U.S. PATENT DOCUMENTS

| | | | | |
|---|---|---|---|---|
| 5,907,621 | A  * | 5/1999 | Bachman et al. | 713/155 |
| 6,757,255 | B1 * | 6/2004 | Aoki et al. | 370/252 |
| 7,561,567 | B1 * | 7/2009 | Olson | G06F 13/126 370/389 |
| 7,567,560 | B1 * | 7/2009 | Balasubramaniyan | 370/389 |
| 8,312,064 | B1 * | 11/2012 | Gauvin | 707/822 |
| 2002/0161903 | A1 * | 10/2002 | Besaw | 709/229 |
| 2005/0220091 | A1 * | 10/2005 | LaVigne | H04L 12/4633 370/389 |
| 2007/0253371 | A1 * | 11/2007 | Harper et al. | 370/331 |
| 2010/0008233 | A1 * | 1/2010 | Ee et al. | 370/241 |
| 2011/0122844 | A1 * | 5/2011 | Harper et al. | 370/331 |
| 2011/0273984 | A1 * | 11/2011 | Hsu | H04L 12/5695 370/235 |
| 2013/0136127 | A1 * | 5/2013 | Hill et al. | 370/392 |

* cited by examiner

*Primary Examiner* — Ryan Jakovac
(74) *Attorney, Agent, or Firm* — Sheridan Ross P.C.

(57) ABSTRACT

Systems, methods, and non-transitory computer-readable storage media for creating dynamic session maps. The method is discussed in terms of a system implementing the method. The system generates a dynamic session map token for a packet in a communication session, wherein the dynamic session map token instructs a node to send a copy of the packet to a specified destination. The dynamic session map token includes a unique dynamic session map identifier, a port number, and an IP address associated with the specified destination. Next, the system adds the dynamic session map token to the packet to yield a tracing packet. The dynamic session map token can be incorporated into the header portion of the packet, for example. Finally, the system transmits the tracing packet to the node. In one embodiment, the system also sends the copy of the packet to the specified destination.

15 Claims, 5 Drawing Sheets

SYSTEM AND METHOD FOR DYNAMIC SESSION MAPS

BACKGROUND

1. Technical Field

The present disclosure relates to network troubleshooting and more specifically to networking mapping with dynamic session maps.

2. Introduction

The growing complexity of computer networks presents significant challenges for network administrators. Charged with the responsibility of managing and troubleshooting a network, network administrators must often comb through voluminous logs of data and test numerous elements in the network to identify and correct even a minor issue in the network. Sifting the evidence and locating the issue, among such a magnitude of information and elements, can quickly become a daunting task. Thus, to facilitate the troubleshooting process, network administrators frequently rely on session maps.

To create a session map, a network administrator first generates a list of every piece of equipment and communication involved. The network administrator then uses this information to create a graphical representation of the equipment and communications involved. This is typically done using network sniffers, which intercept and log traffic on a network. For instance, as messages traverse the network, the network sniffer captures each packet, logs the packet's data, and analyzes its contents. A user can then review the information exchanged and analyze the network.

However, even with a network sniffer, identifying every piece of equipment and communication involved in a problem can be extremely difficult, particularly in larger networks and with dynamic signaling schemes. For example, it is generally not possible to predict what elements in a network are going to be involved in a communication session. As a result, it is also generally not possible to predict where a network sniffer is going to be needed.

Even when a node is known to be involved, identifying the relevant information can be very challenging, since a node will typically handle a large number of packets, many of which may not be relevant to the session of interest, and it may not be practical or possible to silence other network traffic. While in some cases, separating irrelevant packets is as simple as filtering by a port and a source and destination IP address, in many cases, such filtering is not possible, particularly when dealing with signaling nodes that use a fixed port for all signaling. Performing a comprehensive sniff may otherwise unfeasible, at least as a permanent solution. Further, logging everything, everywhere, all the time, does not scale well unless the logging is restricted to what is perceived to be key information, yet such restricted logging would yield an insufficient amount of data to diagnose network problems.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to create dynamic session maps (DSM). DSM can provide a graphical representation of the interactions between various elements (e.g., signaling nodes and media engines) involved in a session at the packet level. In particular, DSM can track signaling, including dynamic signaling, to obtain a complete, real-time description of the relevant interactions on the network. This approach provides an extremely granular ability to trace a specific packet's path through a network. Information gathered in this manner can provide a visualization of the exact network conditions that cause a particular failure.

Disclosed are systems, methods, and non-transitory computer-readable storage media for creating dynamic session maps. The method is discussed in terms of a system implementing the method. The system generates a dynamic session map token for a packet in a communication session, wherein the dynamic session map token instructs a node to send a copy of the packet to a specified destination. The dynamic session map token includes a unique dynamic session map identifier, a port number, and an IP address associated with the specified destination. Next, the system adds the dynamic session map token to the packet to yield a tracing packet. The dynamic session map token can be incorporated into the header portion of the packet, for example. Finally, the system transmits the tracing packet to the node. The system can also send the copy of the packet to the specified destination. The system can incorporate a DSM token to a single packet in a session or to multiple packets in the session. This approach can be manually triggered, or an automatic system can inject DSM tokens into packets when a network metric exceeds or drops below a threshold, such as a call quality metric. Further, a type of DSM token can indicate to network hardware which information to report back.

In one embodiment, the system receives a tracing packet associated with a communication session, the tracing packet comprising a packet and a dynamic session map token, wherein the dynamic session map token is configured to instruct a node to send a copy of the packet to a specified destination. Then, the system forwards the tracing packet to a second node. Finally, the system sends the copy of the packet to the specified destination. In one variation, the node can aggregate or compress copies of packets for periodic transmission to the specified destination.

In another embodiment, the system receives a tracing packet from a node, wherein the tracing packet comprises a copy of a packet in a communication session and a dynamic session map token, and wherein the dynamic session map token is configured to instruct the node to send the copy of the packet to a specified destination. The system then traces the communication session based on the tracing packet.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for automatic DSCP testing for all traffic, media, and signaling. A system, method and non-transitory computer-readable media are disclosed which identify a destination network address to test, and automatically send, via an agent device, a network test configured to determine a Differentiated Services Code Point trace to the destination network address. A brief introductory description of a basic general purpose system or computing device in FIG. 1, which can be employed to practice the concepts, is disclosed herein. A discussion of the Differentiated Services networking architecture and a detailed description of automatic DSCP tracing will then follow, accompanied by variations and examples. These variations shall be discussed herein as the various embodiments are set forth. The disclosure now turns to FIG. 1.

Figure 1:
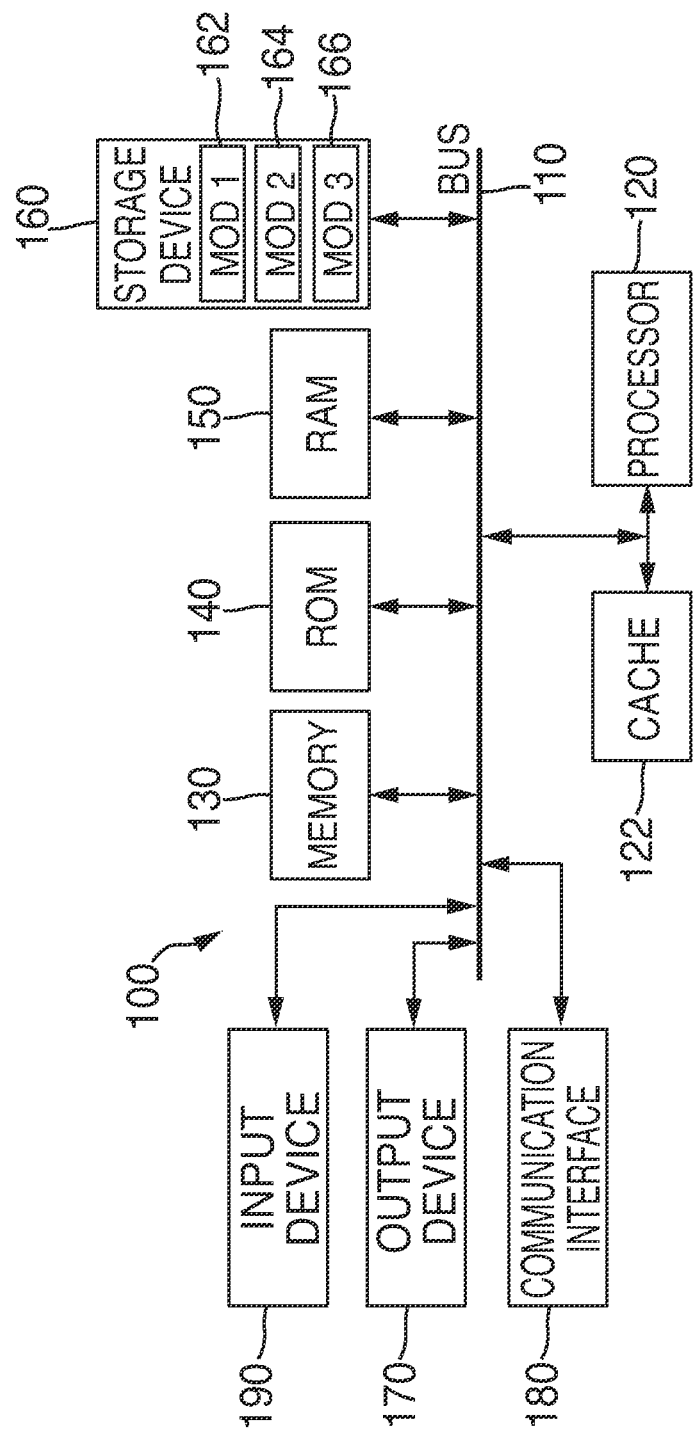
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
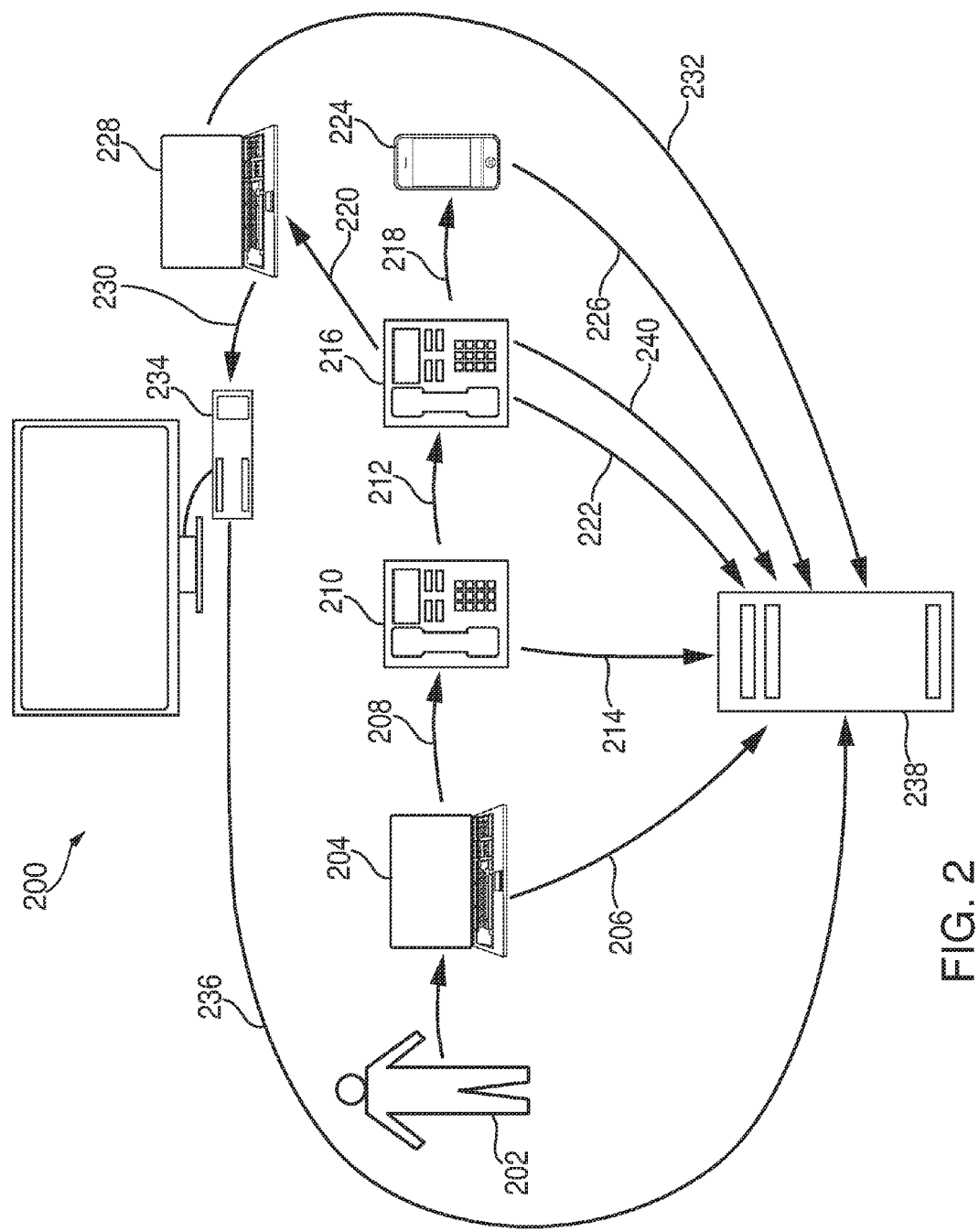
FIG. 2 illustrates an example dynamic packet tracking flow in a communication session.

Having disclosed some components of a computing system, the disclosure now returns to a discussion of applying dynamic session maps to diagnose networks. FIG. 2 illustrates an example dynamic packet tracking flow 200 in a communication session. The principles set forth herein can be applied to local area networks, wide area networks, virtual private networks, intranets, home networks, corporate networks, and virtually any other form of network, as well as multiple interconnected networks. The communication session can be, for example, an application layer session, such as an HTTP session; a session layer session, such as a Session Initiation Protocol (SIP) session; and/or a transport layer session, such as a TCP session. The communication session can also be part of a protocol or service yet to be developed. Moreover, the devices involved in the communication session can include virtually any device with networking capabilities, such as computers, phones, video game consoles, conferencing systems, network media players, etc. Also, the devices involved in the communication session can communicate via one or more networks. The networks can include a public network, such as the Internet, but can also include a private or quasi-private network, such as an intranet, a home network, a virtual private network (VPN), a shared collaboration network between separate entities, etc.

In FIG. 2, a user 202 begins the communication session from the computer 204, or the computer 204 automatically initiates the communication session. The same principles apply regardless of how the communication session is initiated. The computer 204 generates a dynamic session map (DSM) token and transmits a packet with the DSM token 208 from the computer 204 to the VoIP phone 210. In one embodiment, the computer 204 also sends a copy of the packet 206 to the server 238. Alternatively, an intermediate device in the network, such as a router or switch, can determine that a trace is needed, and inject a DSM token into a particular packet or set of packets in a session.

Similarly, a single packet can include more than one DSM token, which each network node can process separately. The network node can process only a highest priority token, or only some subset of the tokens based on available computing power, memory, time, or other resources.

The DSM token can be included in the packet as overhead data. For example, the DSM token can be included in the header of the packet to yield a tracing packet, or added to the packet as metadata. The DSM token includes a unique DSM identifier, the IP address of the server 238, and the port number assigned to the packet. The DSM token can instruct network nodes involved in a communication session (e.g., computers 204 and 228, VoIP phones 210 and 216, mobile phone 224, and video game system 234) to send a copy of the packet to a destination address (e.g., server 238) when sending or receiving the packet with the DSM token.

Moreover, network nodes can be configured to read and implement the DSM token. For example, network nodes can be configured to read the DSM token and send a copy of the packet as directed in the DSM token. Network nodes can be configured to send the copy of the packet every time they send and/or receive the packet with the DSM token. Network nodes can also be configured to propagate the DSM token to new packets. For example, network nodes can be configured to include the DSM token on new packets generated in response to the reception of a packet with a DSM token.

In some cases, the DSM token will propagate automatically. For example, in the case of Session Initiation Protocol (SIP) signaling, the DSM token can be a proprietary header (introduced by the originating station, for example). Here, the SIP protocol will automatically propagate the DSM token, as it is designed to forward headers that are not understood. Thus, in a SIP environment, the DSM token will naturally propagate through the SIP infrastructure, at least up to points where the header is removed.

If a network element is configured to strip the header of packets in the communication session, the network element can be configured to propagate the DSM token to newly created packets. For example, a device may be configured to receive VLAN packets, strip off the VLAN header, construct an Ethernet header, and transmit the packet to an internal network device. Here, the device can be configured to propagate the DSM token such that, if the device receives a VLAN packet with a DSM token, the device can include the DSM token in the Ethernet header before transmitting the packet. As another example, back-to-back user agents (B2BUA) in a SIP environment normally terminate a SIP session on one side of a communication session and originate another session on the other side. When originating another session, B2BUAs are generally not required to propagate information and, therefore, may remove the DSM token from the received packet. Here, the B2BUAs can implement propagation of the DSM token based on internal data about the relationship between the B2BUAs.

As illustrated in FIG. 2, when the VoIP phone 210 receives the packet with the DSM token 208, it sends a copy of the packet 214 to the server 238. The server 238 can be configured to serve as a repository of signaling and media packets that pertain to the communication session with the given DSM identifier. The server 238 can receive the signaling and media packets and store them in a storage device, such as a hard disk drive, a magnetic disk drive, a solid-state drive, an optical disk drive, a tape drive, a redundant array of inexpensive disks (RAID), or the like. While a VoIP phone 210 is illustrated as an example, the intermediate network nodes can include hardware or a combination of hardware and software such as a router, a switch, a modem, a PBX, a network interface controller, a gateway, a server, a wireless router, and so forth.

The VoIP phone 210 then forwards the packet with the DSM token 212 to VoIP phone 216 and sends a copy of the packet 214 to the server 238. The VoIP phone 216 receives the packet with the DSM token 212, forwards the packet with the DSM token 218 to the mobile phone 224, and sends a copy of the packet 222 to the server 238. The mobile phone 224 receives the packet with the DSM token 218 and sends a copy of the packet 226 to the server 238. Instead of instructing network devices to send copies to a separate server, the DSM token can be configured to instruct network devices to send copies back to the source of the network traffic, or to some other destination, such as another network node.

In this example, the VoIP phone 216 also generates and sends a new packet with the DSM token 220 to the computer 228, and sends a copy of the new packet with the DSM token 240 to the server 238. The computer 228 receives the new packet with the DSM token 220, and sends a copy of the new packet 232 to the server 238. Finally, the computer 228 sends the new packet with the DSM token 230 to the video game system 234, which sends a copy of the new packet 236 to the server 238 upon receipt.

As illustrated in FIG. 2, the server 238 obtains information about the signaling and media in the communication session as the DSM token propagates and copies of packets sent and received are accumulated. This information can be used, for example, to identify the network nodes 204, 210, 220, 224, 228, 234 involved in the communication session. Once the network nodes 204, 210, 220, 224, 228, 234 are identified, sniffers, which can be provided by the Service Level Agreement (SLA) Monitor agent, for example, can be activated for a complete record of all of the signaling and media that pertains to the communication session. The server 238 can generate or compile an analytics report describing the received copies of packets. For example, the analytics report can provide information describing the session path through the network, latency experienced at each network link, and so forth. The analytics report can include a graphical representation of the session path or paths through the network.

Figure 3:
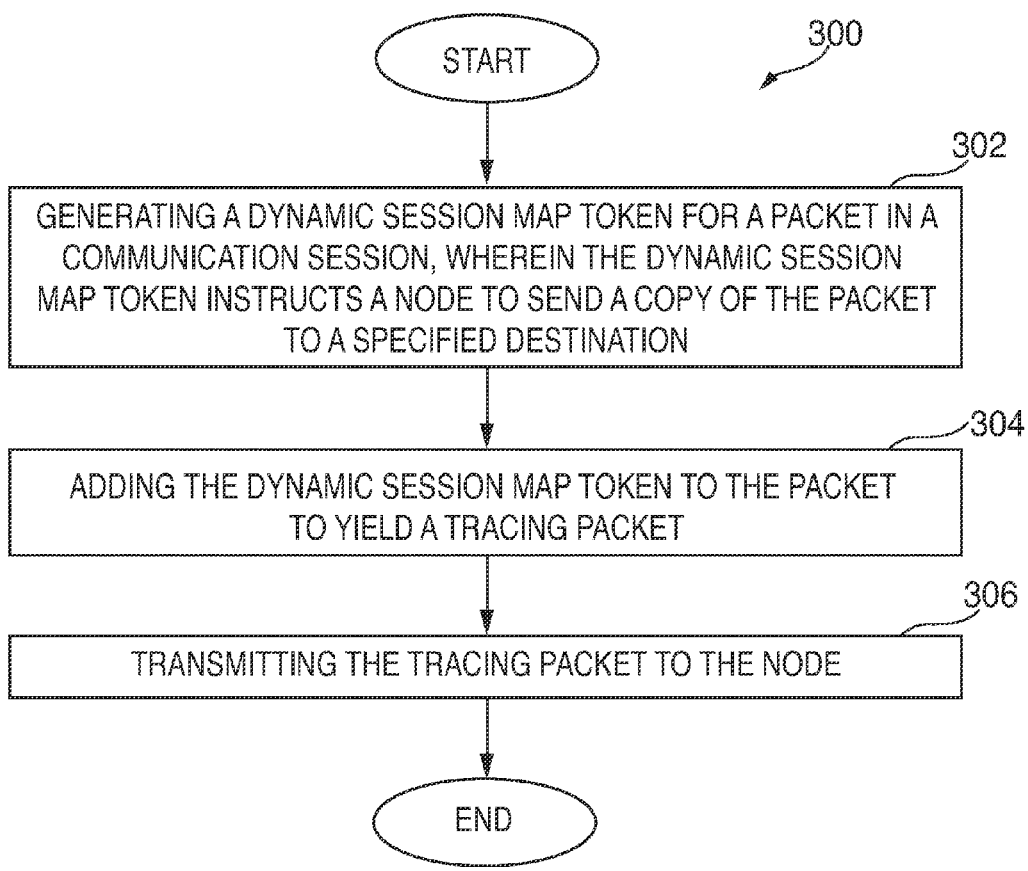
FIG. 3 illustrates a first exemplary method embodiment.
Figure 4:
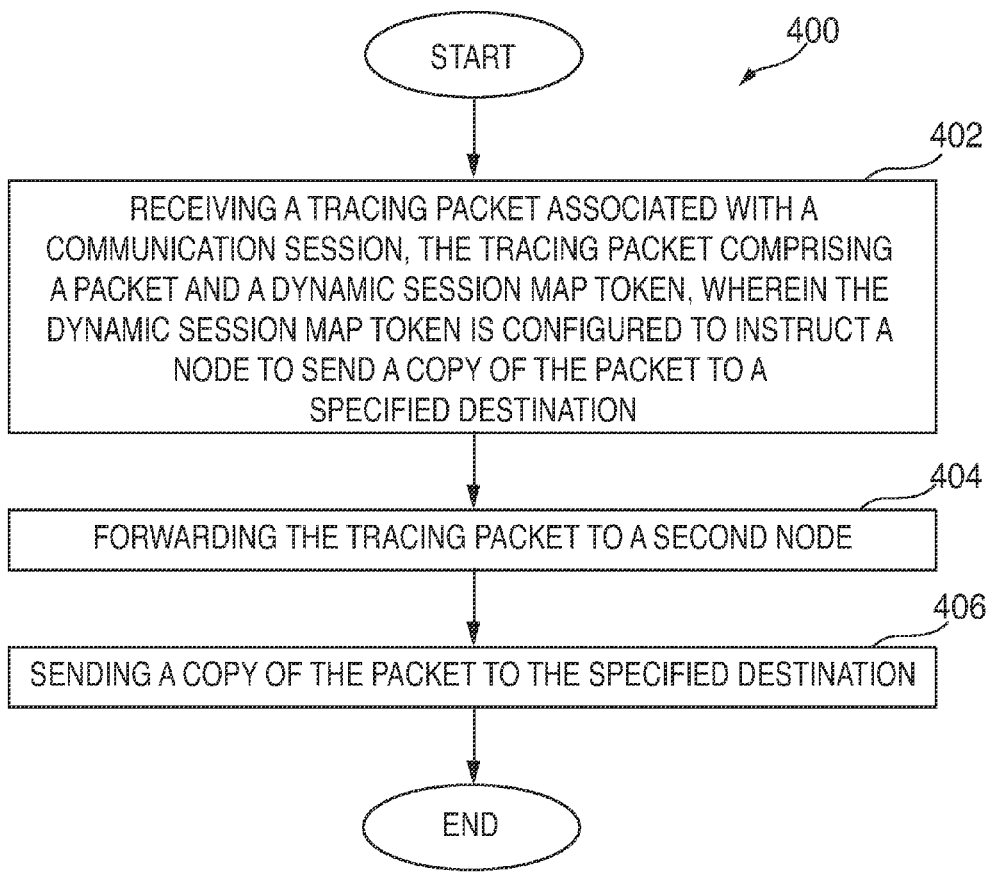
FIG. 4 illustrates a second exemplary method embodiment.
Figure 5:
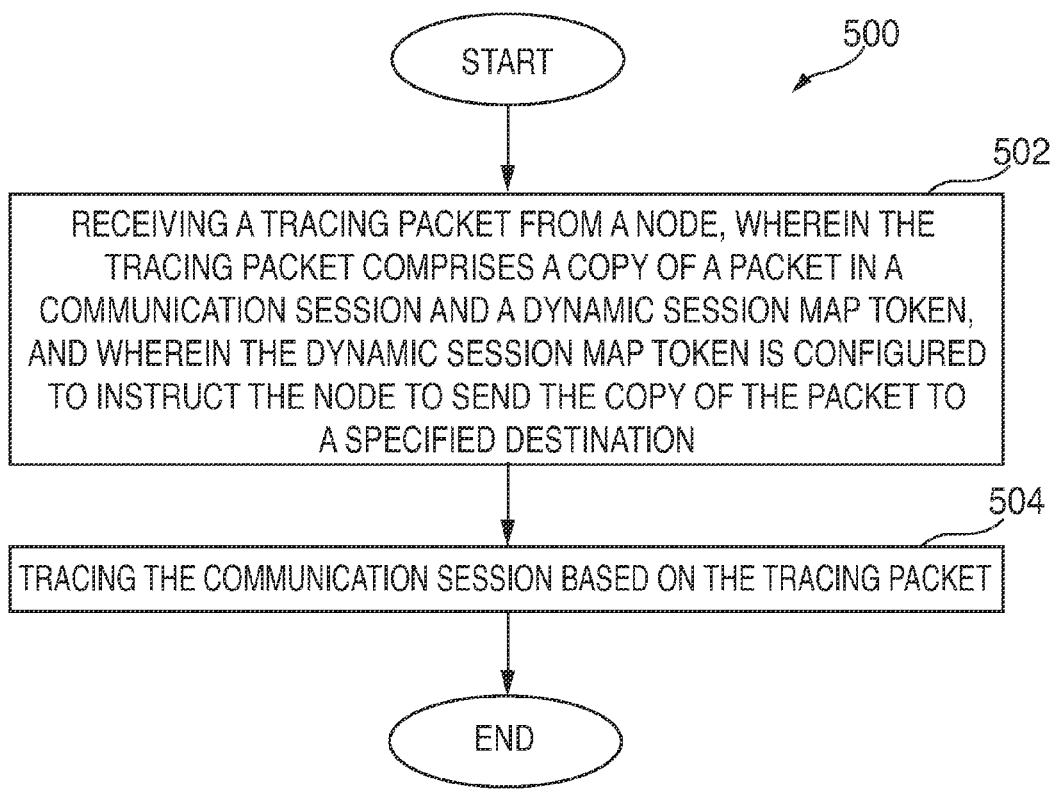
FIG. 5 illustrates a third exemplary method embodiment.

Having disclosed some basic system components and concepts, the disclosure now turns to the exemplary method embodiments shown in FIGS. 3, 4, and 5. For the sake of clarity, the method is discussed in terms of an exemplary system 100 as shown in FIG. 1 configured to practice the method as a registered agent. The steps outlined herein are exemplary and can be implemented in any combination thereof, including combinations that exclude, add, or modify certain steps.

FIG. 3 illustrates a first exemplary method embodiment 300. In this example, the system 100 generates a dynamic session map token for a packet in a communication session, wherein the dynamic session map token instructs a node to send a copy of the packet to a specified destination (302). The dynamic session map token can include a unique dynamic session map identifier, a port number, and an address associated with the specified destination, for example. The dynamic session map token can include other information as well, such as a processing priority, a security code, a token identifier, a timestamp, credentials that were used to create the token, and so forth. In one embodiment, the system generates the dynamic session map token in response to a request to trace the communication session. For example, the system 100 can receive a request from a user to trace the communication session. The system 100 can subsequently generate the dynamic session map token based on the request. The request can include, for example, a unique dynamic session map identifier for the dynamic session map token, a port number for the communication session, and an address associated with the specified destination. The system 100 can generate the dynamic session map token automatically without a user request, such as when certain network measurements trigger a session trace.

The dynamic session map token can be configured to instruct network components to propagate the token to related packets. For example, the dynamic session map token can propagate to packets generated in response to the reception of a packet that has the dynamic session map token. In one embodiment, the dynamic session map token automatically propagates to packets throughout the communication session. In another embodiment, the network nodes are configured to incorporate a copy of the dynamic session map token in packets generated after a packet containing the dynamic session map token is sent and/or received. For example, the network nodes can process dynamic session map tokens automatically based on instructions or hardware components already in the network nodes, but alternatively the network nodes can receive a dynamic session map token, parse it for instructions, and follow the instructions, such as taking certain network environment measurements, as part of propagating the dynamic session map token and sending the copy.

Next, the system 100 adds the dynamic session map token to the packet to yield a tracing packet (304). The tracing packet includes the packet and the dynamic session map token. The dynamic session map token can be included in the packet as overhead data. For example, the dynamic session map token can be a header, or a field in a header, of the packet. In one embodiment, the session map token is included in the packet as metadata. In another embodiment, the session map token is included in the packet as part of the packet header. In yet another embodiment, the session map token is included as the packet header.

Finally, the system 100 transmits the tracing packet to the node (306). The node can be any network node involved in the communication session, for example. In one embodiment, the system 100 also transmits a copy of the packet to the specified destination. Here, the system 100 transmits a copy of the packet to the address and port number specified in the dynamic session map token. For example, if the dynamic session map token includes IP address 192.168.0.100 and port number 5060, the system 100 would transmit the copy of the packet using the IP address 192.168.0.100 and port number 5060 as the destination address. The specified destination can be, for example, a server configured to receive and store packets.

FIG. 4 illustrates a second exemplary method embodiment 400. In this example, the system 100 receives a tracing packet associated with a communication session, the tracing packet comprising a packet and a dynamic session map token, wherein the dynamic session map token instructs the system 100 to send a copy of the packet to a specified destination (402). The dynamic session map token can include a unique dynamic session map identifier, a port number, and an address associated with the specified destination. Moreover, the dynamic session map token can be configured to propagate to related packets. In one embodiment, the dynamic session map token is the packet header in the tracing packet.

Further, the system 100 can be configured to handle the dynamic session map token. For example, the system 100 can be configured to read and implement the dynamic session map token. In one embodiment, the system 100 is configured to send a copy of the packet to a destination specified in the dynamic session map token when the system 100 receives the tracing packet. In another embodiment, the system 100 is configured to send a copy of the packet to a destination specified in the dynamic session map token when the system 100 sends the tracing packet. In yet another embodiment, the system 100 is configured to include the dynamic session map token in any packets it generates in response to the reception and/or transmission of the tracing packet.

Next, the system 100 forwards the tracing packet to a second node (404). The second node can be any network node involved in the communication session, for example. Moreover, addressing information associated with the second node can be included in the header of the tracing packet. Finally, the system 100 sends the copy of the packet to the specified destination (406). Here, the system 100 sends the copy of the packet to the address and port number specified in the dynamic session map token. The specified destination can be a server configured to receive and store packets in communication session, for example.

FIG. 5 illustrates a third exemplary method embodiment 500. The system 100 receives a tracing packet from a node, wherein the tracing packet comprises a copy of a packet in a communication session and a dynamic session map token, and wherein the dynamic session map token is configured to instruct the node to send the copy of the packet to a specified destination (502). Here, the specified destination is the IP address of the system 100 and a port number assigned to the communication session. The dynamic session map token can include a unique dynamic session map identifier, a port number, and an address associated with the specified destination. Also, the dynamic session map token can be added to the tracing packet as overhead data. For example, the dynamic session map token can be added to a portion of the tracing packet header.

The dynamic session map token can propagate to any packet in the communication session. For example, the dynamic session map token can automatically propagate to packets associated with the tracing packet. The system 100 can be configured to receive and store packets, such as the tracing packet, from nodes involved in the communication session. In one embodiment, the system 100 is a server configured to serve as a repository of all of the signaling and media packets that pertain to the communication session associated with the unique dynamic session map identifier. The signaling and media packets can be used for diagnostics. For example, the signaling and media packets can be used to create various visualizations of the network and/or the communication session.

Finally, the system 100 traces the communication session based on the tracing packet (504). Here, the tracing packet can provide information about the signaling and media associated with the packet. The tracing packet can also include the necessary information to identify the nodes involved in a communication session. In one embodiment, the tracing packet is used to identify the nodes involved in a communication session, and a sniffer is then activated to capture signaling and media information that pertains to the communication session. The system 100 and/or sniffer can then generate a record of the signaling and media in the communication session. The sniffer can be a software program on the system 100 or any other device connected to the network. For example, the sniffer can be a function provided by a Service Level Agreement (SLA) agent on the system 100.

In one embodiment, the system 100 receives a plurality of tracing packets, each of the plurality of tracing packets comprising a copy of a respective packet in the communication session and the dynamic session map token. The system 100 then traces the communication session based on the plurality of tracing packets to yield a traced session and generates a dynamic session map based on the traced session. The dynamic session map can be, for example, a visualization of the communication session, tracing packets, network(s), communication path, timing, network nodes, and/or network conditions.

The dynamic session map can include a graphical representation of the interactions between the various elements involved in the communication session. For example, the dynamic session map can include a graphical representation of the interactions between the signaling nodes and media engines involved in a session at the packet level. In one embodiment, the dynamic session map illustrates nodes as they get involved in the communication session, together with edges between the nodes in colors that distinguish between the time and type of interaction. In another embodiment, the dynamic session map plays back the communication in slow motion, and in a step-by-step fashion, illustrating the individual exchanges. The dynamic session map can be used, for example, to perform network troubleshooting and/or management. The dynamic session map can be used to perform network diagnostics. In another embodiment, the dynamic session map is used to identify failures that may result in various exchanges, such as to identify a recurring problem, or to identify a problem on the fly that has arisen on a particular session.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein can be applied to trace any message in a network and network communications governed by any type of communications protocol. Those skilled in the art will readily recognize various modifications and changes that may be made to the principles described herein without following the example embodiments and applications illustrated and described herein, and without departing from the spirit and scope of the disclosure.

I claim:

1. A method comprising:
generating, by a first node of a network, a dynamic session map token for a packet in a communication session between the first node and a second node of the network, wherein the dynamic session map token is configured to instruct the second node to send a copy of the packet to a network address of a specified destination;
adding, by the first node of the network, the dynamic session map token to a header of the packet to yield a tracing packet, wherein the tracing packet comprises at least the dynamic session map token added by the first node and a second token injected into the tracing packet by an intermediate node;
transmitting the tracing packet from the first node to the second node, wherein the second node processes packets based on a priority of the plurality of tokens therein; and
transmitting a copy of the tracing packet from the first node to the network address of the specified destination.

2. The method of claim 1, wherein the dynamic session map token comprises at least a unique dynamic session map identifier, a port number, or the network address of the specified destination.

3. The method of claim 1, the method further comprising:
receiving a request to trace the communication session; and
generating the dynamic session map token based on the request.

4. The method of claim 3, wherein the request comprises at least one of a unique dynamic session map identifier, a port number, or the network address of the specified destination.

5. The method of claim 1, wherein the dynamic session map token is configured to propagate to a related packet.

6. A system comprising:
a processor; and
a memory having stored therein instructions which, when executed by the processor, cause the computer processor to perform operations comprising:
generating, by a first node of a network, a dynamic session map token for a packet in a communication session between the first node and a second node of the network, wherein the dynamic session map token is configured to instruct the second node to send a copy of the packet to a network address of a specified destination;
adding, by the first node of the network, the dynamic session map token to a header of the packet to yield a tracing packet, wherein the tracing packet comprises at least the dynamic session map token added by the first node and a second token injected into the tracing packet by an intermediate node;
forwarding the tracing packet from the first node to the second node, wherein the second node processes packets based on a priority of the plurality of tokens therein; and
sending the copy of the tracing packet from the first node to the network address of the specified destination.

7. The system of claim 6, the memory storing further instructions which, when executed by the processor, cause the processor to perform operations further comprising configuring the processor to handle the dynamic session map token.

8. The system of claim 6, wherein the dynamic session map token is configured to propagate to a related packet.

9. The system of claim 8, the memory storing further instructions which, when executed by the processor, cause the processor to perform operations further comprising generating the related packet, wherein the dynamic session map token is propagated to the related packet.

10. The system of claim 6, wherein the dynamic session map token comprises at least a unique dynamic session map identifier, a port number, or the network address of the specified destination.

11. A non-transitory computer-readable medium storing instructions which, when executed by a processor, cause the processor to perform operations comprising:
generating, by a first node of a network, a dynamic session map token for a packet in a communication session between the first node and a second node of the network, wherein the dynamic session map token is configured to instruct the second node to send a copy of the packet to a network address of a specified destination;
adding, by the first node of the network, the dynamic session map token to a header of the packet to yield a tracing packet, wherein the tracing packet comprises at least the dynamic session map token added by the first node and a second token injected into the tracing packet by an intermediate node;
transmitting the tracing packet from the first node to the second node, wherein the second node processes packets based on a priority of the plurality of tokens therein; and transmitting a copy of the tracing packet from the first node to the network address of the specified destination.

12. The non-transitory computer-readable medium of claim 11, wherein the dynamic session map token comprises at least a unique dynamic session map identifier, a port number, or the network address of the specified destination.

13. The non-transitory computer-readable medium of claim 11, the method further comprising:
receiving a request to trace the communication session; and
generating the dynamic session map token based on the request.

14. The non-transitory computer-readable medium of claim 13, wherein the request comprises at least one of a unique dynamic session map identifier, a port number, or the network address of the specified destination.

15. The non-transitory computer-readable medium of claim 11, wherein the dynamic session map token is configured to propagate to a related packet.

\* \* \* \* \*